United States Patent
Kuo et al.

(10) Patent No.: US 9,284,233 B2
(45) Date of Patent: Mar. 15, 2016

(54) PELLETIZED FERTILIZER AND METHOD FOR MANUFACTURING THE SAME

(71) Applicant: CHUNGHWA PICTURE TUBES, LTD, Taoyuan (TW)

(72) Inventors: Chou-Chiang Kuo, New Taipei (TW); Min-Lun Wu, Toufen Township, Miaoli County (TW); Che-Wei Chang, Daxi Township, Taoyuan County (TW)

(73) Assignee: CHUNGHWA PICTURE TUBES, LTD., Padeh, Taoyuan (TW)

( * ) Notice: Subject to any disclaimer, the term of this patent is extended or adjusted under 35 U.S.C. 154(b) by 102 days.

(21) Appl. No.: 13/783,716

(22) Filed: Mar. 4, 2013

(65) Prior Publication Data
US 2014/0041430 A1 Feb. 13, 2014

(30) Foreign Application Priority Data
Aug. 9, 2012 (TW) .............................. 101128787 A

(51) Int. Cl.
| | |
|---|---|
| C05D 5/00 | (2006.01) |
| C05G 3/00 | (2006.01) |
| C05B 7/00 | (2006.01) |
| C05C 5/02 | (2006.01) |
| C05C 9/00 | (2006.01) |
| C05D 9/02 | (2006.01) |

(52) U.S. Cl.
CPC ................ *C05G 3/0082* (2013.01); *C05B 7/00* (2013.01); *C05C 5/02* (2013.01); *C05C 9/005* (2013.01); *C05D 5/00* (2013.01); *C05D 9/02* (2013.01); *C05G 3/0047* (2013.01)

(58) Field of Classification Search
None
See application file for complete search history.

(56) References Cited

U.S. PATENT DOCUMENTS 7,217,735 B1 * 5/2007 Au et al. ........................ 514/456

FOREIGN PATENT DOCUMENTS

| CN | 1470485 A | 1/2004 |
|---|---|---|
| CN | 101948352 A | 1/2011 |
| TW | 262458 | 11/1995 |

OTHER PUBLICATIONS

Ni, Boli et al. "Novel Slow-Release Multielement Compound Fertilizer with Hydroscopicity and Moisture Preservation". Ind. Eng. Chem. Res. 2010, 49, 4546-4552.*
Xie et al. "Slow-release nitrogen and boron fertilizer from a functional superabsorbent formulation based on wheat straw and attapulgite". Chemical Engineering Journal 167 (2011) 342-348.*

* cited by examiner

*Primary Examiner* — Jennifer A Smith
(74) *Attorney, Agent, or Firm* — Muncy, Geissler, Olds & Lowe, P.C.

(57) ABSTRACT

A method for manufacturing a pelletized fertilizer includes the following steps. A water-soluble manure and a colloidal solution are mixed, to form an aqueous solution of a fertilizer, wherein the water-soluble manure is selected from the group consisting of monopotassium phosphate, epsomite, manganous sulfite, boric acid, borax, copper sulfate pentahydrate, white vitriol, ammonium molybdate, urea, ferric ethylenediaminetetraacetic acid and potassium nitrate, the colloidal solution is selected from the group consisting of agar, xanthan gum, shellac, guar gum, natto gum, pectin, synthetic hydrogel and PLGA, and the weight percentage of the colloidal solution in the aqueous solution of the fertilizer is between 1.5 and 15%. The aqueous solution of the fertilizer is added into a water within a temperature range between 0 and 4° C., whereby the aqueous solution of the fertilizer is solidified to the pelletized fertilizer.

2 Claims, 5 Drawing Sheets

PELLETIZED FERTILIZER AND METHOD FOR MANUFACTURING THE SAME

CROSS-REFERENCE TO RELATED APPLICATION

This application claims the benefit of Taiwan Patent Application No. 101128787, filed on Aug. 9, 2012, which is hereby incorporated by reference for all purposes as if fully set forth herein.

BACKGROUND OF THE INVENTION

1. Field of the Invention

The present invention relates to a pelletized fertilize and a method for manufacturing the same, and in particular to a pelletized fertilize and a method for manufacturing the same in the field of a hydroponic culture.

2. Related Art

In the past, fruits, vegetables or flowers are generally cultivated by using the soil cultivation. The soil cultivation is that the plants are placed outdoors. Therefore, the plants are easily affected by pests, light pollution or weather, such that the growth process and the standard of the plants cannot be controlled or forecasted, to cause economic losses of the farmer.

Based on the above reasons, the modern structure technology and agricultural nutrient solution technology are combined to a technique of the hydroponic culture, that occupies a rather high proportion and an important position especially in the technical field of a refined agriculture and a high economic crop.

The composition ratio and concentration stability of the nutrient solution is the most important environmental factor, and also is easily ignored in the technology of the hydroponic culture. Therefore, an experienced hydroponic farmer looked upon the composition ratio and the concentration stability of the nutrient solution as important trade secrets. Furthermore the conductivity and pH of the nutrient solution are changed because the plants absorb elements of the nutrient solution. Therefore, in the conventional method, large quantities of water and the nutrient solution of the hydroponic culture are circulatively flowed by a motor, in order to maintain the stability of the nutrient solution. But, in the conventional method the energy consumption is rather great, and the nutrient solution contact with the outside sun light so as likely to breed a large quantities of algal blooms and to directly affect the growth of plants too.

Thus, it is required to provide a fertilizer which can stably release a nutrient solution, and be able to solve the problem of the energy consumption because of the circulative flow by a motor.

SUMMARY OF THE INVENTION

The present invention provides a method for manufacturing a pelletized fertilizer including the following steps of: mixing a water-soluble manure and a colloidal solution, to form an aqueous solution of a fertilizer, wherein the water-soluble manure is selected from at least one of the group consisting of monopotassium phosphate ($KH_2PO_4$), epsomite ($MgSO_4.7H_2O$), manganous sulfite ($MnSO_4.4H_2O$), boric acid ($H_3BO_3$), borax ($Na_2B_4O_7.10H_2O$), copper sulfate pentahydrate ($CuSO_4.5H_2O$), white vitriol ($ZnSO_4.7H_2O$), ammonium molybdate (($NH_4)_6Mo_7O_{24}.4H_2O$), urea ($CO(NH_2)_2$), ferric ethylenediaminetetraacetic acid (Fe-EDTA) and potassium nitrate ($KNO_3$), the colloidal solution is selected from at least one of the group consisting of agar, xanthan gum, shellac, guar gum, natto gum, pectin, synthetic hydrogel and PLGA (poly(lactic-co-glycolic acid)), and the weight percentage of the colloidal solution content in the aqueous solution of the fertilizer is between 1.5 and 15%; and adding the aqueous solution of the fertilizer into a water within a temperature range between 0 and 4° C., whereby the aqueous solution of the fertilizer is solidified to the pelletized fertilizer The present invention provides a pelletized fertilizer comprising: a colloid including a main body and a plurality of voids, and a water-soluble manure interfused to the main body of the colloid.

The present invention uses crosslink properties of the colloidal solution to mix with and uniformly cover the high concentration water-soluble manure, whereby the aqueous solution of the fertilizer is solidified to the pelletized fertilizer. A void diameter of the colloid is controlled by different concentration of the colloidal solution, and the size of the immobilized pelletized fertilizer is adjusted during the manufacture of the pelletized fertilizer, whereby the releasing rate of the water-soluble manure in the pelletized fertilize is controlled. During the use of the pelletized fertilizer, the pelletized fertilizer can release the water-soluble manure in the water, so a circulation motor is not required and algae is not easily bred, thereby reducing the energy consumption and the cost of cultivation. Furthermore, since the pelletized fertilize is a biodegradable materials, the pelletized fertilize can be directly buried in farmland as a compost, and the pelletized fertilize is decomposed by the microorganism in the soil to increase the soil fertility. Also, the pelletized fertilize can be used for hydroponics, too

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
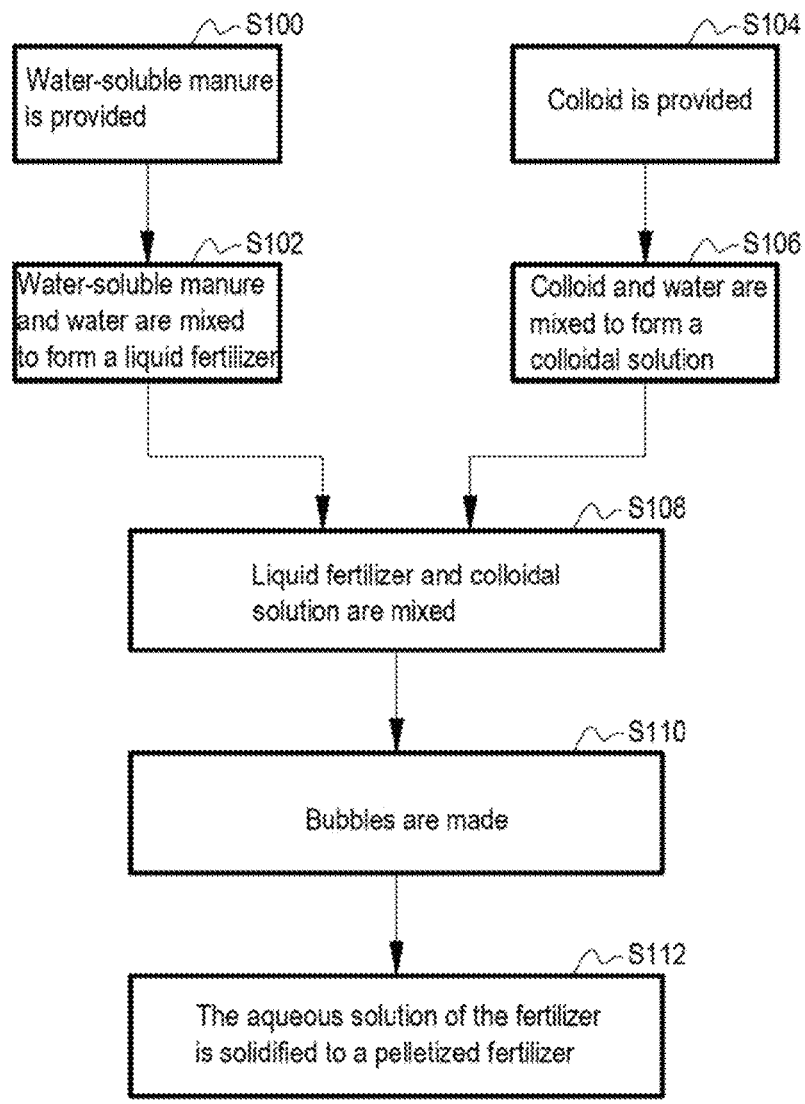
FIG. 1 is a flow diagram showing a method for manufacturing a pelletized fertilizer according to a first embodiment of the present invention.

In the description below, components with like or similar functions and structures are indicated with like reference numerals and designations throughout various embodiments to maintain consistency in description of the present invention.

Referring to FIG. 1, it is a flow diagram showing a method for manufacturing a pelletized fertilizer according to a first embodiment of the present invention. The method for manufacturing the pelletized fertilizer includes the following steps:

In Step S100: a water-soluble manure is provided. In this embodiment, the water-soluble manure is selected from at least one of the group consisting of monopotassium phosphate ($KH_2PO_4$), epsomite ($MgSO_4.7H_2O$), manganous sulfite ($MnSO_4.4H_2O$), boric acid ($H_3BO_3$), borax ($Na_2B_4O_7 \cdot 10H_2O$), copper sulfate pentahydrate ($CuSO_4 \cdot 5HO_2$), white vitriol ($ZnSO_4 \cdot 7H_2O$), ammonium molybdate (($NH^4$)$_6Mo_7O_{24} \cdot 4H_2O$), urea ($CO(NH_2)_2$), ferric ethylenediaminetetraacetic acid (Fe-EDTA) and potassium nitrate ($KNO_3$).

For example, the water-soluble manure includes monopotassium phosphate ($KH_2PO_4$), epsomite ($MgSO_4 \cdot 7H_2O$), manganous sulfite ($MnSO_4 \cdot 4H_2O$), boric acid ($H_3BO_3$), borax ($Na_2B_4O_7 \cdot 10H_2O$), copper sulfate pentahydrate ($CuSO_4 \cdot 5HO_2$), white vitriol ($ZnSO_4 \cdot 7H_2O$), ammonium molybdate (($NH_4$)$_6Mo_7O_{24} \cdot 4H_2O$) and urea ($CO(NH_2)_2$), whose concentration and ratio can be adjusted according to the necessary manure of different plants.

In Step S102: the water-soluble manure and the water are mixed to form a liquid fertilizer. In this embodiment, the water-soluble manure and the water are mixed to form the liquid fertilizer, and in the mixing process, the water-soluble manure and the water can be heated and stirred simultaneously or respectively, whereby the water-soluble manure is dissolved into the water quickly.

In Step S104: a colloid is provided. In this embodiment, the colloid can be selected from at least one of the group consisting of agar, xanthan gum, shellac, guar gum, natto gum, pectin, synthetic hydrogel and PLGA (poly(lactic-co-glycolic acid)).

For example, the colloid includes the agar and xanthan gum.

In Step S106: the colloid and the water are mixed to form a colloidal solution. In this embodiment, the agar, the xanthan gum and the water are mixed to form the colloidal solution, and the colloidal solution is heated to 100° C., and 100° C. is kept for 10 to 20 minutes, whereby the agar, the xanthan gum and the water can be fully mixed.

In Step S108: the liquid fertilizer and the colloidal solution are mixed, to form an aqueous solution of the fertilizer. In this embodiment, the liquid fertilizer and the colloidal solution can be mixed to the aqueous solution of the fertilizer. In another embodiment, the water-soluble manure and the colloidal solution can be directly mixed to the aqueous solution of the fertilizer. The temperature of the aqueous solution of the fertilizer can be kept within a range between 60 and 80° C. The weight percentage of the colloidal solution in the aqueous solution of the fertilizer is between 1.5 and 15%. Preferably, the weight percentage of the agar in the colloidal solution of the fertilizer is about 5%, and the weight percentage of the xanthan gum in the colloidal solution of the fertilizer is about 3%.

In Step S110: bubbles are made. In this embodiment, many and fine bubbles are made in the aqueous solution of the fertilizer by using a stirring process or a blowing process. For example, a homogenizer is used to stir the aqueous solution of the fertilizer, whereby many and fine bubbles are made in the aqueous solution of the fertilizer. Thus, after solidifying, the average specific weight of a pelletized fertilizer can be changed to control the up and down of the immobilized pelletized fertilizer in the water.

In Step S112: the aqueous solution of the fertilizer is solidified to a pelletized fertilizer. In this embodiment, the aqueous solution of a fertilizer is added into an ice water by using instilling, spraying or injecting process, whereby the aqueous solution of the fertilizer is solidified to the pelletized fertilizer. For example, the aqueous solution of the fertilizer can be sucked by a peristaltic pump, and then the aqueous solution of the fertilizer is slowly instilled into the ice water within a temperature range between 0 and 4° C. at constant rate by a dropper, whereby drops of the aqueous solution of the fertilizer are form to spherical colloids of the pelletized fertilize by using the low temperature crosslink. Furthermore, the size of the pelletized fertilizer can be adjusted by controlling the rotational speed of the peristaltic pump.

Figure 2:
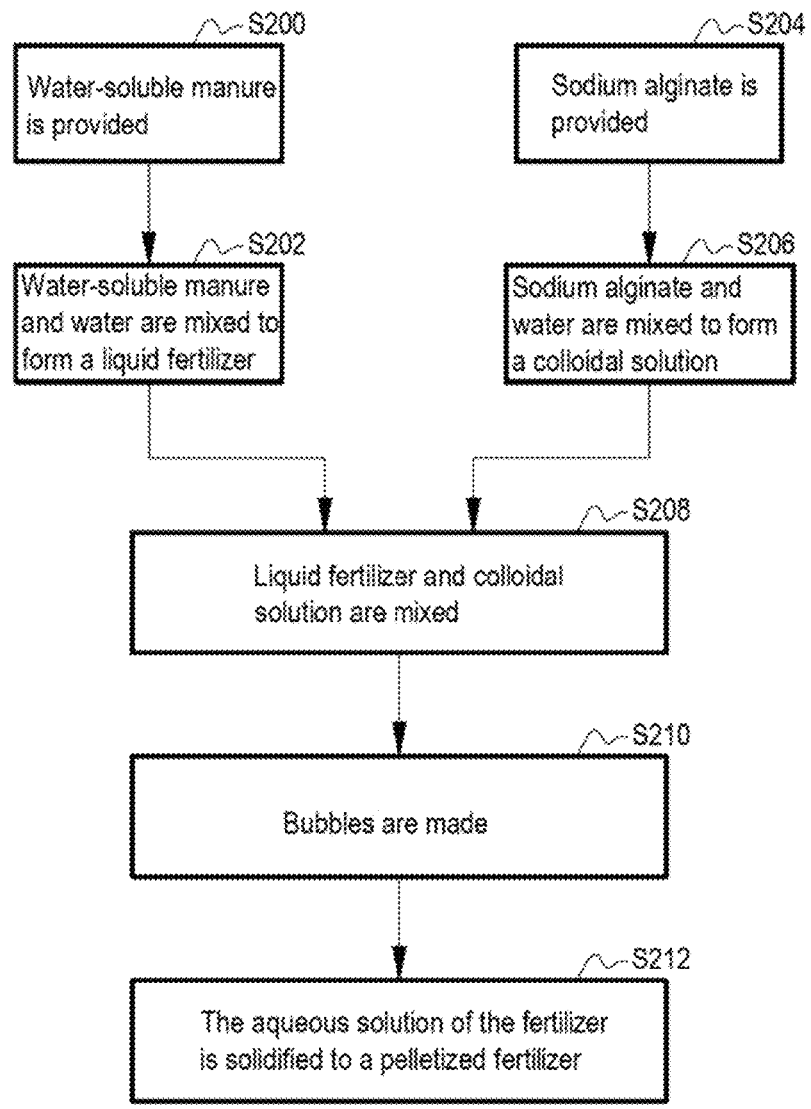
FIG. 2 is a flow diagram showing a method for manufacturing a pelletized fertilizer according to a second embodiment of the present invention.

Referring to FIG. 2, it is a flow diagram showing a method for manufacturing a pelletized fertilizer according to a second embodiment of the present invention. A method for manufacturing the pelletized fertilizer includes the following steps:

In Step S200: a water-soluble manure is provided. In this embodiment, the water-soluble manure is selected from at least one of the group consisting of monopotassium phosphate ($KH_2PO_4$), epsomite ($MgSO_4 \cdot 7H_2O$), manganous sulfite ($MnSO_4 \cdot 4H_2O$), boric acid ($H_3BO_3$), borax ($Na_2B_4O_7 \cdot 10H_2O$), copper sulfate pentahydrate ($CuSO_4 \cdot 5HO_2$), white vitriol ($ZnSO_4 \cdot 7H_2O$), ammonium molybdate (($NH_4$)$_6Mo_7O_{24} \cdot 4H_2O$), urea ($CO(NH_2)_2$), ferric ethylenediaminetetraacetic acid (Fe-EDTA) and potassium nitrate ($KNO_3$).

For example, the water-soluble manure includes ferric ethylenediaminetetraacetic acid (Fe-EDTA) and potassium nitrate ($KNO_3$), whose concentration and ratio can be adjusted according to the necessary manure of different plants.

In Step S202: the water-soluble manure and the water are mixed, to form a liquid fertilizer. In this embodiment, the water-soluble manure and the water are mixed to form the liquid fertilizer, and in the mixing process, the water-soluble manure and the water can be heated and stirred simultaneously or respectively, whereby the water-soluble manure is dissolved into the water quickly.

In Step S204: a sodium alginate is provided.

In Step S206: the sodium alginate and the water are mixed to form a colloidal solution. In this embodiment, the sodium alginate and the water are mixed to form the colloidal solution, and the temperature of the colloidal solution is kept within a range between 25 and 50° C.

In Step S208: the liquid fertilizer and the colloidal solution are mixed, to form an aqueous solution of the fertilizer. In this embodiment, the liquid fertilizer and the colloidal solution can be mixed to the aqueous solution of the fertilizer. In another embodiment, the water-soluble manure and the colloidal solution can be directly mixed to the aqueous solution of the fertilizer. The temperature of the aqueous solution of the fertilizer can be kept within a range between 25 and 50° C. The weight percentage of the sodium alginate content in the aqueous solution of the fertilizer is within a range between 0.5 and 34%. Preferably, the weight percentage of the sodium alginate in the colloidal solution is about 4%.

In Step S210: bubbles are made. In this embodiment, many and fine bubbles are made in the aqueous solution of the fertilizer by using a stirring process, a blowing process or a chemical reaction process. For example, in the method of the chemical reaction, sodium carbonate ($Na_2CO_3$) and hydrochloric acid (HCl) are added into the aqueous solution of the fertilizer to make a large quantity of carbon dioxide ($CO_2$) gas, whereby many and fine bubbles are made in the aqueous solution of the fertilizer. Thus, after solidifying, the average specific weight of a pelletized fertilizer can be changed to control the up and down of the immobilized pelletized fertilizer in the water.

In Step S212: the aqueous solution of the fertilizer is solidified to a pelletized fertilizer. In this embodiment, the aqueous solution of the fertilizer can be sucked by a peristaltic pump, and then the aqueous solution of the fertilizer is slowly instilled into an aqueous solution of calcium nitrate ($Ca(NO_3)_2 \cdot 4H_2O$) (or an aqueous solution of calcium chloride ($CaCl_2$)) having a molarity within a range between 0.1 and 1 mole (e.g., 0.3 mole) at constant rate by a dropper, to form spherical colloids of the pelletized fertilize. Then, the aqueous solution of the calcium nitrate ($Ca(NO_3)_2$) is stood for 1 hour, and then $Ca^{2+}$ is permeated into the spherical colloids, to form the solidified pelletized fertilizer.

Figure 3:
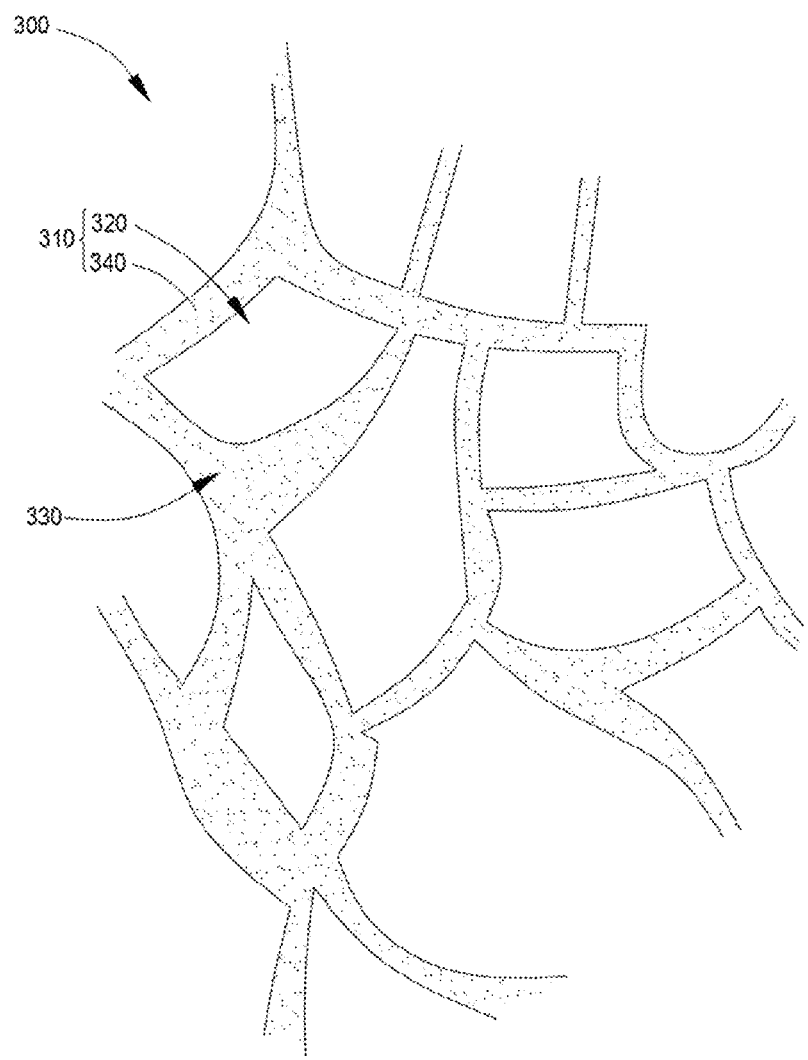
FIG. 3 is a partially schematic view of a pelletized fertilizer of the present invention.

Referring to FIG. 3, it is a partially schematic view of a pelletized fertilizer of the present invention. The pelletized fertilizer 300 includes a colloid 310 and a water-soluble manure 330. The colloid 310 includes a main body 340 and a plurality of voids 320. The water-soluble manure 330 is interfused to the main body 340 of the colloid 310. In the first embodiment of the present invention, the ingredient of the colloid 310 can be constituted by agar and xanthan gum, and the ingredient of the water-soluble manure 330 can be constituted by monopotassium phosphate ($KH_2PO_4$), epsomite ($MgSO_4.7H_2O$), manganous sulfite ($MnSO_4.4H_2O$), boric acid ($H_3BO_3$), borax ($Na_2B_4O_7.10H_2O$), copper sulfate pentahydrate ($CuSO_4.5HO_2$), white vitriol ($ZnSO_4.7H_2O$), ammonium molybdate (($NH_4)_6Mo_7O_{24}.4H_2O$) and urea ($CO(NH_2)_2$). In the second embodiment of the present invention, the ingredient of the colloid 310 can be constituted by sodium alginate doped with $Ca^{2+}$; and the ingredient of the water-soluble manure 330 can be constituted by ferric ethylenediaminetetraacetic acid (Fe-EDTA) and potassium nitrate ($KNO_3$).

In fact, after the water-soluble manure 330 and the colloid 310 are mixed, the water-soluble manure 330 is not in a shape of dots shown in the FIG. 3, but the shape of dots shown FIG. 3 is used in order to clear describe the water-soluble manure 330 and the colloid 310.

Figure 4:
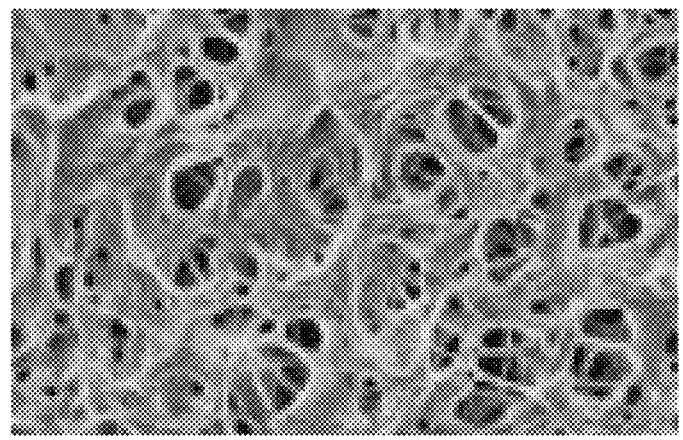
FIG. 4 is a partial photo of a pelletized fertilizer of the present invention.

FIG. 4 is a partial photo of a pelletized fertilizer of the present invention. The pelletized fertilizer of the present invention is observed by the electronic microscope, and then the photo of the pelletized fertilizer is taken by the electronic microscope.

Figure 5:
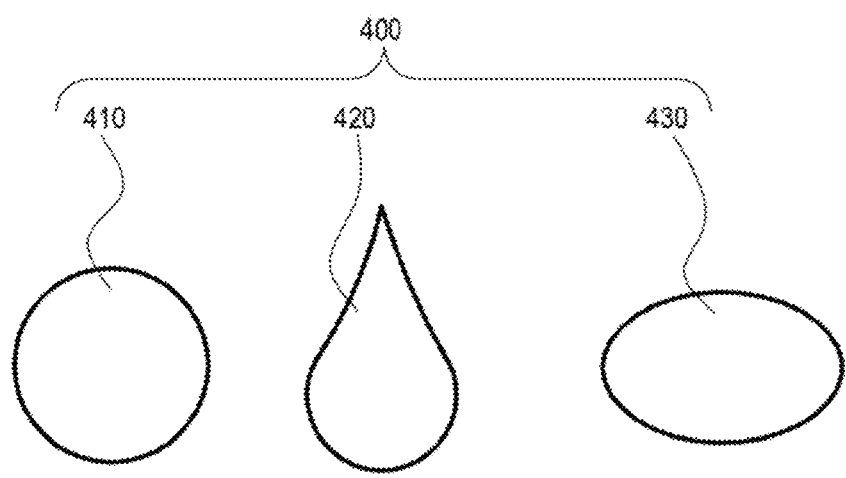
FIG. 5 is a schematic view of a pelletized fertilizer of the present invention.

FIG. 5 is a schematic view of a pelletized fertilizer of the present invention. The pelletized fertilizers are in different shapes, because the used instruments, the set parameters or the proportion of the material are different. Therefore, the forms of the pelletized fertilizer 400 are different shapes, for example: globular shape 410, water-drop shaped 420, ellipsoidal shape 430 or other irregular shape, and diameters of the pelletized fertilizers 400 are within a range between 0.3 and 0.5 centimeter, wherein the present invention is not be limited.

Therefore, the present invention uses crosslink properties of the colloidal solution to mix with and uniformly cover the high concentration water-soluble manure, whereby the aqueous solution of the fertilizer is solidified to the pelletized fertilizer. A void diameter of the colloid is controlled by different concentration of the colloidal solution, and the size of the immobilized pelletized fertilizer is adjusted during the manufacture of the pelletized fertilizer, whereby the release rate of the water-soluble manure from the pelletized fertilize can be controlled. During the use of the pelletized fertilizer, the pelletized fertilizer can release the water-soluble manure in the water, so a circulation motor is not required and algae is not easily bred, thereby reducing the energy consumption and the cost of cultivation. Furthermore, since the pelletized fertilize is a biodegradable materials, the pelletized fertilize can be directly buried in farmland as a compost, and the pelletized fertilize is decomposed by the microorganism in the soil to increase the soil fertility. Also, the pelletized fertilize can be used for hydroponics, too.

The above descriptions of the preferred embodiments are only intended to illustrate the present invention, but not to limit the present invention. Various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A pelletized fertilizer comprising:
   a colloid comprising a main body and a plurality of voids; and
   a water-soluble manure interfused to the main body of the colloid, wherein the colloid is selected from at least one of the group consisting of agar, xanthan gum, shellac, guar gum, natto gum, pectin, and PLGA (poly(lactic-co-glycolic acid)), and the water-soluble manure is selected from at least one of the group consisting of epsomite ($MgSO_4.7H_2O$), manganous sulfite ($MnSO_4.4H_2O$), boric acid ($H_3BO_3$), copper sulfate pentahydrate ($CuSO_4.5HO_2$), white vitriol ($ZnSO_4.7H_2O$), ammonium molybdate (($NH_4)_6Mo_7O_{24}.4H_2O$), ferric ethylenediaminetetraacetic acid (Fe-EDTA) and potassium nitrate ($KNO_3$), and
   a diameter of the pelletized fertilizer is within a range between 0.3 and 0.5 centimeter.
2. The pelletized fertilizer of claim 1, wherein the form of pelletized fertilizer is globular shape, water-drop shaped or ellipsoidal shape.

* * * * *